A. TAUB 1,655,169

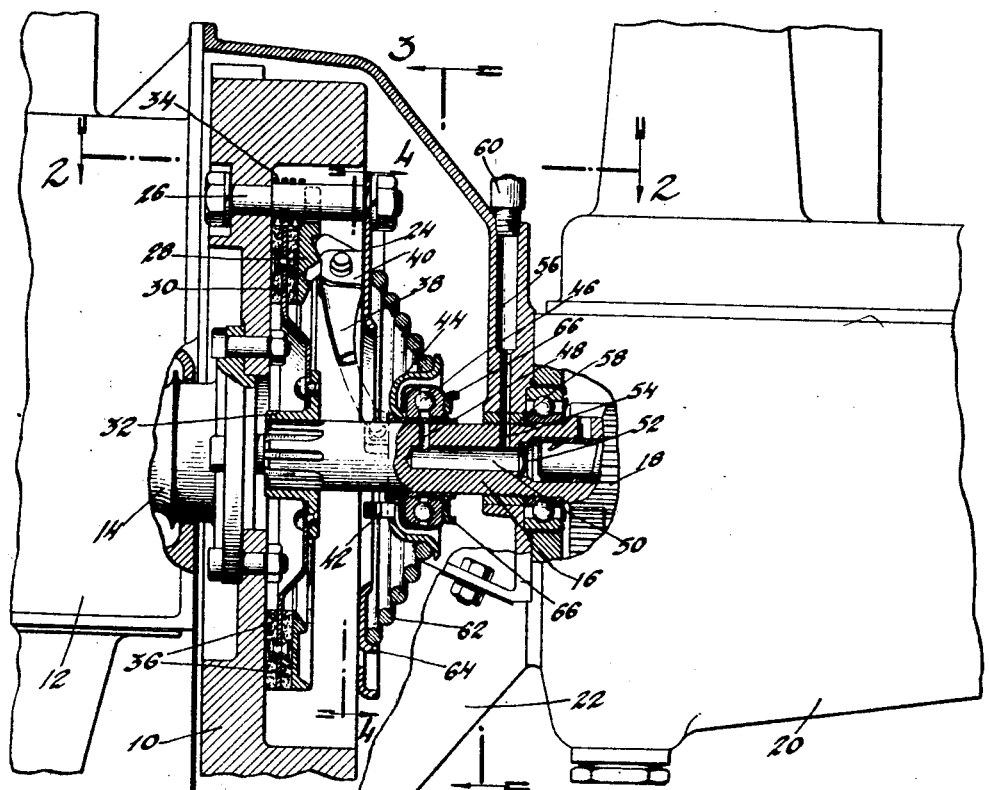
Fig. 1
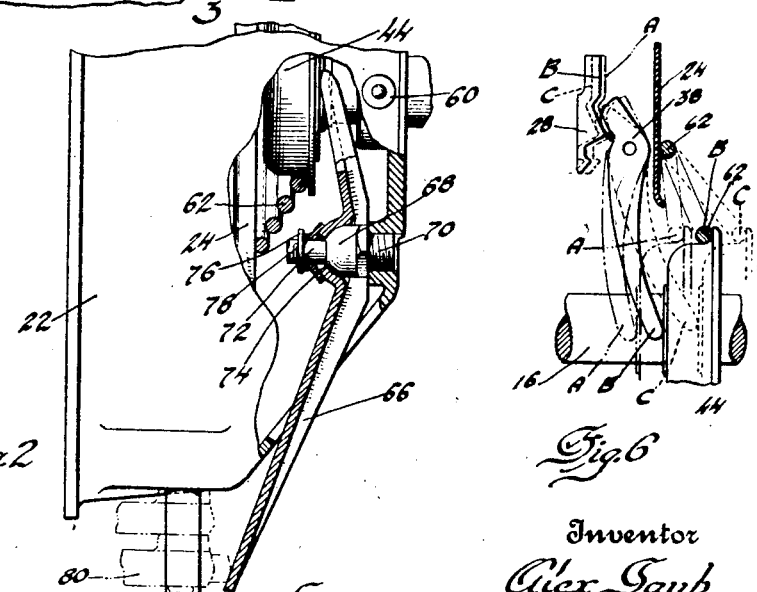
Fig. 2
Fig. 6
Inventor
Alex Taub
By his Attorneys
Blackmore, Spencer & Flint Jan. 3, 1928.

CLUTCH

Filed March 7, 1924 2 Sheets-Sheet 2

Inventor
Alex Taub
By his Attorneys

Patented Jan. 3, 1928.

1,655,169

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

CLUTCH.

Application filed March 7, 1924. Serial No. 697,599.

This invention relates to clutches, and is illustrated as embodied in a plate clutch for an automobile.

The invention has for its object the improvement of the operating mechanism of such clutches; various features of the invention relating to a novel combination of parts permitting the use of a cheap pressed metal clutch release lever, to an improved and simple arrangement insuring adequate lubrication of the clutch release bearing, to a cheapening of the cost of manufacture by pressing out loops from the housing of the clutch release bearing which hook over and operate the clutch-actuating levers, to a desirable modification of a clutch to facilitate assembly and which contemplates pivoting the clutch-actuating levers on the outer plate of the clutch and operating them by novel mechanism described below, and to a provision for equalizing the action of the clutch regardless of wear on the clutch facings.

The above and other objects and features of the invention will be apparent from the following description of one illustrative embodiment shown in the accompanying drawings, in which Figure 1 is a view, partly in side elevation and partly in longitudinal vertical section, of the clutch and adjacent parts of the engine and transmission;

Figure 2 is a view, partly in top plan and partly in section on the line 2—2 of Figure 1, showing the mounting of the clutch release lever;

Figure 6 is a diagram showing equalization as the clutch facing wears.

Figure 3:
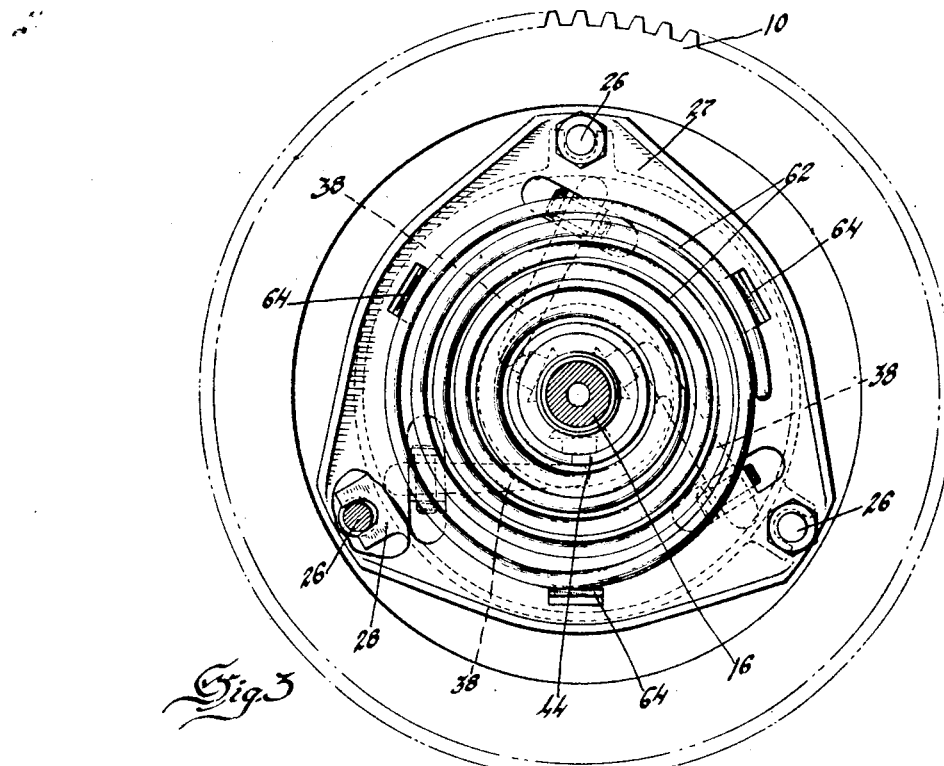
Figure 3 is a section on the line 3—3 of Figure 1, showing the mounting of the clutch release bearing on the driven shaft.
Figure 4:
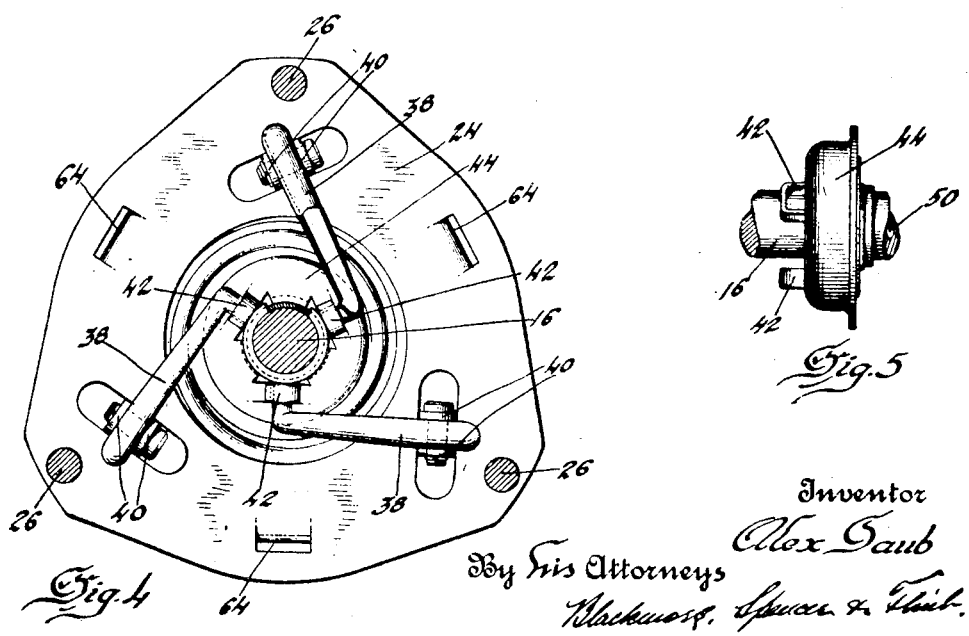
Figure 4 is a section on the line 4—4 of Figure 1, showing the connection of the clutch-actuating levers to the clutch release bearing.
Figure 5:
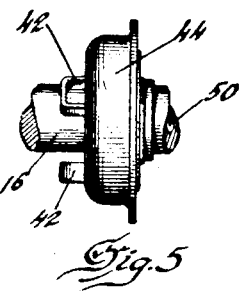
Figure 5 is a side elevation of the clutch release bearing on the driven shaft.

In the arrangement selected for illustration, the clutch is of the plate type, and is associated with a flywheel 10 of an automobile engine 12 having a crankshaft 14 bolted to the flywheel, the clutch being arranged to connect to the flywheel and crankshaft a driven shaft 16 carrying the drive gear 18 of a transmission 20. The flywheel and clutch are inclosed in a suitable housing 22.

The clutch comprises generally a plate 24 fixedly secured in spaced relation to flywheel 10 by bolts 26, and a movable plate 28 which has notches embracing the bolts 26 so that it rotates with the flywheel but is axially movable by connections controlled by the clutch pedal to grip between itself and the flywheel 10 a driven plate 30 secured to a hub 32 splined to the driven shaft 16, thus causing shaft 16 to turn with the crankshaft 14. Plate 28 is urged to the right in Figure 1 by springs 34 surrounding bolts 26. Rings 36 of friction material may be riveted or otherwise secured to driven plate 30. Except as further described below, the above-identified parts may be of any desired construction.

Plate 28 is urged to the left in Figure 1, against the resistance of springs 34, by clutch-actuating levers 38, each of which is pivoted intermediate its length between lugs 40 carried by the spaced plate 24. Each lever engages at its outer end a cam or wedge surface on plate 28, and is hooked at its inner end into a loop shaped lug 42 pressed out from the sheet metal housing 44 of a clutch release anti-friction bearing 46 slidable axially on shaft 16. As more particularly shown in Figure 6, and as explained in detail below, the wedge surface on plate 28, against which each lever 38 bears, is so designed that as the friction facings 36 wear away and the clutch spring varies accordingly in tension, the mechanical advantage of levers 38 is automatically changed to preserve the original pressure on the clutch plate 28.

The clutch release bearing 46 may be lubricated by oil discharged through a radial passage 48 communicating with an axial chamber 50 closed by a plug 52. Oil is supplied to chamber 50 through a radial passage 54 which registers once each revolution with a passage 56 through the shaft bearing 58 and through part of housing 22, the passage being accessible through a suitable fitting 60. It will be seen that movement of the clutch release bearing 46 to the left (Figure 1) will release the clutch, while movement toward the right will throw the clutch in.

Clutch release bearing 46 is urged toward the right, to throw the clutch in, by a spiral spring 62 confined between a flange on housing 44 and plate 24, there being lugs 64 struck up from plate 24 to prevent radial expansion of the spring. Bearing 46 is moved to the left, to disengage the clutch against the resistance of spring 62, by a clutch release lever 66, shown as being pressed out from sheet metal. This lever is forked at its inner end to straddle shaft 16 and engage opposite sides of bearing 46, and is fulcrumed intermediate its length on the inside of housing 22 by being formed with a semi-spherical socket receiving a spherical portion of a member 68 threaded on a bolt 70 tapped into the housing. Bolt 70 has a stem 72 extending through an opening in the semi-spherical socket, which stem carries a retainer 74 held by a washer 76 locked by a cotter pin 78. The outer end of clutch release lever 66 is engaged by the bottom of a lever 80, which may be a part of the clutch pedal carried below its fulcrum or may be a lever operated in some other manner by the clutch pedal.

As explained above, an important detail of the invention relates to automatically compensating for wear of the clutch facings. Three positions of the operating parts are shown in Figure 6, position A being with the clutch released, position B being with new clutch facings, and position C being with clutch facings which are badly worn. It will be seen that the position C holds spring 62 under less tension than position B, which would ordinarily tend to allow the clutch to slip. To compensate automatically for this, and preserve a uniform pressure on plate 28, the cam or wedge surface on plate 28 is so designed, and the end of lever 38 swings in such an arc, that the mechanical advantage of the lever increases as the facings wear, in the same proportion as the tension of spring 62 decreases.

While one illustrative embodiment of my invention has been described in detail, it is not my intention to limit its scope to that embodiment, or otherwise than by the terms of the appended claims.

I claim:

1. A clutch comprising, in combination, a flywheel, a plate fixedly secured to the flywheel in spaced relation therefrom, a shaft having a driven plate between the flywheel and its spaced plate, a movable plate rotating with the flywheel but axially movable with respect thereto, levers engaging the movable plate and the spaced plate, a spring rocking the levers to grip the driven plate between the flywheel and the movable plate, a clutch release anti-friction bearing movable axially of the shaft to compress the spring and release the driven plate, a clutch housing having an opening, a pressed metal clutch release lever, the inner end of which is forked and straddles the shaft and engages the clutch release bearing, and which lever extends through the opening in the clutch housing and has a semi-spherical socket intermediate its ends, and which socket is provided with an opening, a fulcrum member inside the housing having a spherical portion entering the socket, and a stem extending through the opening therein, and a retaining member upon said stem and engaging the socket to hold the lever on the fulcrum member.

2. A clutch comprising, in combination, a flywheel, a plate fixedly secured to the flywheel in spaced relation therefrom, a shaft having a driven plate between the flywheel and its spaced plate, a movable plate rotating with the flywheel but axially movable with respect thereto, levers engaging the movable plate and the spaced plate, a spring rocking the levers to grip the driven plate between the flywheel and the movable plate, a clutch release anti-friction bearing movable axially of the shaft to compress the spring and release the driven plate, a clutch housing, a clutch release lever fulcrumed on the housing and engaging the clutch release bearing, a clutch pedal operating the lever, said shaft having an axial lubricant chamber and an opening discharging radially therefrom into the clutch release bearing and a feed opening leading radially into the lubricant chamber adjacent the end of the clutch housing, together with a shaft bearing in the end of the housing and a stationary lubricant-feeding channel opening through the bearing and registering each revolution with said feed opening.

3. A clutch comprising, in combination, a flywheel, a plate fixedly secured to the flywheel in spaced relation therefrom, a driven shaft having a driven plate between the flywheel and the spaced plate, a movable plate between the driven plate and the spaced plate which rotates with the flywheel but is movable axially toward and from the flywheel to grip and release the driven plate, a clutch release anti-friction bearing on the shaft having a sheet metal housing member with integral loop-shaped lugs pressed out therefrom on the side toward the driven plate, cam levers having their ends hooked into the loop-shaped lugs and engaging the movable plate and the spaced plate at their opposite ends, a spring for moving the clutch release bearing axially in one direction, and pedal mechanism for moving it in the opposite direction against the resistance of the spring, movement of the clutch release bearing by the spring rocking the levers to move the movable plate in such a manner as to grip the driven plate between the movable plate and the flywheel.

4. A clutch comprising, in combination, a flywheel, a movable plate rotating with the flywheel but axially movable with respect thereto, a shaft having a driven plate between the flywheel and said movable plate, a clutch release anti-friction bearing movable axially of the shaft, levers engaging the movable plate and said anti-friction bearing, a spring for urging the bearing axially, a clutch housing, a passage therein, a passage extending axially in said shaft, and a radial passage at the opposite ends of said axial passage, one of said passages adapted to register with said anti-friction bearing and the other adapted to register with the passage in the clutch housing for the purpose of lubricating the anti-friction bearing.

In testimony whereof I affix my signature.

ALEX TAUB.